United States Patent
Bergman et al.

(10) Patent No.: US 10,536,970 B2
(45) Date of Patent: Jan. 14, 2020

(54) PDCCH INITIALIZATION SUITABLE FOR MTC DEVICES

(71) Applicant: Telefonaktiebolaget LM Ericsson (publ), Stockholm (SE)

(72) Inventors: Johan Bergman, Stockholm (SE); Yufei Blankenship, Kildeer, IL (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 378 days.

(21) Appl. No.: 14/915,464

(22) PCT Filed: Jan. 26, 2016

(86) PCT No.: PCT/SE2016/050046
§ 371 (c)(1),
(2) Date: Feb. 29, 2016

(87) PCT Pub. No.: WO2016/122379
PCT Pub. Date: Aug. 4, 2016

(65) Prior Publication Data
US 2016/0360551 A1    Dec. 8, 2016

Related U.S. Application Data

(60) Provisional application No. 62/109,350, filed on Jan. 29, 2015.

(51) Int. Cl.
*H04W 74/00* (2009.01)
*H04W 4/70* (2018.01)
(Continued)

(52) U.S. Cl.
CPC ......... *H04W 74/006* (2013.01); *H04L 5/0037* (2013.01); *H04L 5/0094* (2013.01);
(Continued)

(58) Field of Classification Search
None
See application file for complete search history.

(56) References Cited

U.S. PATENT DOCUMENTS

2012/0039180 A1\* 2/2012 Kim ............... H04L 5/0053
370/241
2012/0076103 A1\* 3/2012 Dai ............... H04W 72/1289
370/329
(Continued)

FOREIGN PATENT DOCUMENTS

EP    3048848 A1 \* 7/2016  ....... H04W 72/1289
GB    2529984 A  \* 3/2016  ........... H04W 4/70
(Continued)

OTHER PUBLICATIONS

3GPP TS 36.211 v12.0.0; Technical Specification; 3rd Generation Partnership Project; Technical Specification Group Radio Access Network; Evolved Universal Terrestrial Radio Access (E-UTRA); Physical channels and modulation (Release 12)—Dec. 2013.
(Continued)

*Primary Examiner* — Chi H Pham
*Assistant Examiner* — Vladislav Y Agureyev
(74) *Attorney, Agent, or Firm* — Baker Botts, LLP

(57) ABSTRACT

The present disclosure concerns radio communication. More particularly, the present disclosure inter alia introduces techniques to allow low-complexity UEs 120*a-j*, e.g. Rel-13 MTC devices, to operate in a legacy LTE system with maintained, or improved, performance.

12 Claims, 8 Drawing Sheets

(51) Int. Cl.
*H04W 76/27* (2018.01)
*H04L 5/00* (2006.01)
*H04W 72/02* (2009.01)
*H04W 72/04* (2009.01)
*H04W 72/08* (2009.01)
*H04W 74/08* (2009.01)

(52) U.S. Cl.
CPC ............ *H04W 4/70* (2018.02); *H04W 72/02* (2013.01); *H04W 72/042* (2013.01); *H04W 72/085* (2013.01); *H04W 74/0833* (2013.01); *H04W 76/27* (2018.02); *H04L 5/0044* (2013.01); *H04L 5/0048* (2013.01); *H04L 5/0053* (2013.01)

(56) References Cited

U.S. PATENT DOCUMENTS

| | | | |
|---|---|---|---|
| 2012/0327894 A1* | 12/2012 | Axmon | H04W 48/12 370/330 |
| 2013/0039291 A1* | 2/2013 | Blankenship | H04L 5/001 370/329 |
| 2013/0083753 A1* | 4/2013 | Lee | H04W 74/0833 370/329 |
| 2013/0114419 A1* | 5/2013 | Chen | H04L 5/0053 370/248 |
| 2013/0121274 A1* | 5/2013 | Chen | H04L 5/0053 370/329 |
| 2013/0136098 A1* | 5/2013 | Li | H04W 72/042 370/330 |
| 2013/0242882 A1* | 9/2013 | Blankenship | H04W 72/042 370/329 |
| 2013/0315159 A1 | 11/2013 | Xia et al. | |
| 2014/0056244 A1* | 2/2014 | Frenne | H04L 5/0053 370/329 |
| 2014/0133433 A1* | 5/2014 | Ahn | H04W 74/002 370/329 |
| 2014/0192733 A1* | 7/2014 | Charbit | H04L 5/0053 370/329 |
| 2014/0307692 A1* | 10/2014 | Hong | H04W 72/042 370/329 |
| 2015/0085689 A1* | 3/2015 | Vos | H04W 4/70 370/252 |
| 2015/0188684 A1* | 7/2015 | Takeda | H04W 72/04 370/329 |
| 2015/0257173 A1* | 9/2015 | You | H04L 1/1864 370/330 |
| 2016/0127952 A1* | 5/2016 | You | H04W 4/005 370/252 |
| 2016/0128055 A1* | 5/2016 | Xiong | H04W 72/048 370/329 |
| 2016/0135141 A1* | 5/2016 | Burbidge | H04W 68/02 455/458 |
| 2016/0135176 A1* | 5/2016 | Wong | H04W 4/70 370/329 |
| 2016/0143017 A1* | 5/2016 | Yang | H04L 1/1812 370/329 |
| 2016/0150462 A1* | 5/2016 | Yang | H04W 4/70 370/254 |
| 2016/0242169 A1* | 8/2016 | Park | H04W 4/005 |
| 2016/0249331 A1* | 8/2016 | Park | H04L 1/1819 |
| 2016/0255591 A1* | 9/2016 | Park | H04W 52/242 455/522 |
| 2016/0278052 A1* | 9/2016 | Kim | H04L 1/0041 |
| 2016/0309470 A1* | 10/2016 | Yi | H04W 72/0446 |
| 2016/0337086 A1* | 11/2016 | Shen | H04L 1/1861 |
| 2016/0338018 A1* | 11/2016 | Awad | H04W 4/70 |
| 2016/0345301 A1* | 11/2016 | Webb | H04W 72/042 |
| 2016/0345314 A1* | 11/2016 | Webb | H04L 1/08 |
| 2017/0230951 A1* | 8/2017 | Xiong | H04W 4/70 |

FOREIGN PATENT DOCUMENTS

| | | | | |
|---|---|---|---|---|
| RU | 2326497 C2 | 6/2003 | | |
| WO | 2001 121578 A1 | 6/2003 | | |
| WO | 20080135575 A1 | 11/2008 | | |
| WO | 20080157692 A2 | 12/2008 | | |
| WO | 2011 121578 A2 | 10/2011 | | |
| WO | 2013 153375 A1 | 10/2013 | | |
| WO | 2014 204128 A1 | 12/2014 | | |
| WO | WO-2014204128 A1 * | 12/2014 | ............ | H04W 28/20 |
| WO | WO 2015050339 A1 * | 4/2015 | ............... | H04B 7/26 |
| WO | WO 2015056924 A1 * | 4/2015 | ............... | H04L 1/00 |
| WO | WO 2015114694 A1 * | 8/2015 | .......... | H04W 72/048 |
| WO | WO-2015115579 A1 * | 8/2015 | ............. | H04W 4/70 |

OTHER PUBLICATIONS

3GPP TS 36.213 v12.0.0; Technical Specification; 3rd Generation Partnership Project; Technical Specification Group Radio Access Network; Evolved Universal Terrestrial Radio Access (E-UTRA); Physical layer procedures (Release 12) —Dec. 2013.

3GPP TSG RAN WG1 Meeting #79; San Francisco, USA; Source: ZTE; Title: Physical downlink control channel for MTC enhancement (R1-144817) Nov. 17-21, 2014.

3GPP TSG RAN WG1 Meeting #79; San Francisco, USA; Source: MediaTek Inc.; Title: SIB, RAR and Paging for Rel-13 MTC UE in normal and coverage extension (R1-144851) Nov. 17-21, 2014.

3GPP TSG RAN WG1 Meeting #79; San Francisco, USA; Source: NTT Docomo; Title: Design of EPDCCH search space for low cost MTC (R1-144964) Nov. 17-21, 2014.

3GPP TSG RAN WG1 Meeting #80bis; Belgrade, Serbia; Source: InterDigital; Title: On SIB transmission for MTC (R1-152129) Apr. 20-24, 2015.

3GPP TSG RAN WG1 Meeting #81; Fukuoka, Japan; Source: Ericsson; Title: EPDCCH initialization for MTC (R1-152501) May 25-29, 2015.

PCT International Search Report for International application No. PCT/SE2016/050046—dated Apr. 8, 2016.

PCT Written Opinion of the International Searching Authority for International application No. PCT/SE2016/050046—dated Apr. 8, 2018.

Russian Search Report issued for Application No. 2017130339/07(052842)—dated Apr. 20, 2018.

EPO Communication Pursuant to Article 94(3) EPC for Application No. 16 704 489.0-1219—dated Sep. 19, 2018.

3GPP TSG RAN WG1 Meeting #79; San Francisco, USA; Source: Intel Corporation; Title: Control channel enhancement for unicast transmission for MTC (R1-144661—Nov. 17-21, 2014.

3GPP TSG RAN WG1 Meeting #79; San Francisco, USA; Source: Alcatel-Lucent, Alcatel-Lucent Shanghai Bell; Title: Coverage enhancement for physical data & control channels (R1-144697)—Nov. 17-21, 2014.

3GPP TSG RAN WG1 Meeting #79; San Francisco, USA; Source: Alcatel-Lucent, Alcatel-Lucent Shanghai Bell; Title: Coverage enhancement for common control messages (R1-144698)—Nov. 17-21, 2104.

Summary of JP Office Action issued for Japanese Patent Application No. 2017-540239—dated Sep. 25, 2018.

Communication Pursuant to Article 94(3) EPC issued by the European Patent Office for Application No. 16 704 489.0—1219—Apr. 12, 2019.

3GPP TSG RAN WG1 Meeting #76bis; Shenzhen, China; Source: Sharp; Title: PDSCH scheduling for low-cost MTC UEs (R1-141323)—Mar. 31-Apr. 4, 2014.

3GPP TSG-RAN WG1 #76b; Shenzhen, China; Source: MediaTek Inc.; Title: Analysis on PDSCH resource allocation for low cost MTC (R1-141482)—Mar. 31-Apr. 4, 2014.

* cited by examiner

PDCCH INITIALIZATION SUITABLE FOR MTC DEVICES

PRIORITY

This nonprovisional application is a U.S. National Stage Filing under 35 U.S.C. § 371 of International Patent Application Serial No. PCT/SE2016/050046 filed Jan. 26, 2016, and entitled "PDCCH Initialization Suitable For MTC Devices" which claims priority to U.S. Provisional Patent Application No. 62/109,350 filed Jan. 29, 2015, both of which are hereby incorporated by reference in their entirety.

TECHNICAL FIELD

This disclosure generally relates to radio communication. More particularly, the embodiments presented herein generally relate to Physical Downlink Control Channel (PDCCH) Initialization for User Equipment (UE) having limited (e.g., reduced) UE bandwidth as compared with regular UEs. Fore example, some of the embodiments presented herein generally relate to PDCCH Initialization for machine type communication (MTC) devices, e.g. Rel-13 MTC devices (i.e. MTC devices of Release 13). For example, this disclosure presents various embodiments to initialize PDCCH for narrow-band MTC operation in Long Term Evolution (LTE).

BACKGROUND

This section is intended to provide a background to the various embodiments of the technology that are described in this disclosure. The description herein may include concepts that could be pursued, but are not necessarily ones that have been previously conceived or pursued. Therefore, unless otherwise indicated herein, what is described in this section is not necessarily prior art to the embodiments of this disclosure and is not admitted to be prior art by the mere inclusion in this section.

Radio communication networks are widely deployed to provide various communication services such as telephony, video, data, messaging, broadcasts, and so on. Such communication networks support communications for multiple user equipments (UEs) by sharing the available network resources. One example of such a network is the Universal Mobile Telecommunications System (UMTS), a third generation (3G) mobile phone technology standardized by the 3rd Generation Partnership Project (3GPP). UMTS includes a definition for a Radio Access Network (RAN), referred to as UMTS Terrestrial Radio Access Network (UTRAN). The UMTS, which is the successor to Global System for Mobile Communications (GSM) technologies, supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with mobile communications. For example, third-generation UMTS based on W-CDMA has been deployed in many places of the world. To ensure that this system remains competitive in the future, 3GPP began a project to define the long-term evolution of UMTS cellular technology. The specifications related to this effort are formally known as Evolved UMTS Terrestrial Radio Access (E-UTRA) and Evolved UMTS Terrestrial Radio Access Network (E-UTRAN), but are more commonly referred to by the name Long Term Evolution (LTE). More detailed descriptions of radio communication networks and systems can be found in literature, such as in Technical Specifications published by, e.g., the 3GPP. The core network (CN) of the evolved network architecture is sometimes referred to as Evolved Packet Core (EPC) and when referring to a complete cellular system, including both radio access network and core network, as well as other possible entities, such as service related entities, the term Evolved Packet System (EPS) can be used.

As a mere background only, FIG. 1 illustrates an example 3GPP LTE radio communication system 100.

As can be seen, FIG. 1 illustrates a radio access network in an LTE radio communication system 100. In this example, there are two radio network nodes 110a and 110b, each of which is exemplified as an evolved NodeB (eNB). A first eNB 110a is configured to serve one or several UEs, 120a-e, located within the eNB's 100a geographical area of service or the radio cell 130a. The eNB 110a is connectable to a core network (CN). The eNB 110a is also connectable, e.g. via an X2 interface, to a neighboring eNB 110b configured to serve another cell 130b. Accordingly, the second eNB 110b is configured to serve one or several UEs, 120f-j, located within the eNB's 100b geographical area of service or the cell 130b. The eNB 110b is also connectable to a CN.

As is known in the existing art, LTE uses Orthogonal Frequency Division Multiplex (OFDM) in the downlink and DFT-spread OFDM (i.e., DFTS-OFDM, where DFT stands for Discrete Fourier Transform) in the uplink. The basic LTE downlink physical resource can thus be seen as a time-frequency grid as illustrated in FIG. 2, where each resource element corresponds to one OFDM subcarrier during one OFDM symbol interval.

Machine Type Communication (MTC)

A currently popular vision of the future development of the communication in radio communication networks comprises huge numbers of small autonomous devices, which typically, more or less infrequently (e.g., once per week to once per minute) transmit and receive only small amounts of data (or are polled for data). These devices are not assumed to be associated with humans, but may rather be sensors or actuators of different kinds, which may communicate with application servers (which configure the devices and receive data from them) within or outside the cellular network. Hence, this type of communication is often referred to as machine-to-machine (M2M) communication and the devices may be denoted machine devices (MDs). In the 3GPP standardization, the corresponding alternative terms are machine type communication (MTC) and machine type communication devices (MTC devices), with the latter being a subset of the more general term UE. More detailed descriptions of MTC communication can be found in literature, e.g., in the Technical Specification 3GPP TS 22.368 V.13.1.0.

With the nature of MTC devices and their assumed typical uses follow that these MTC devices will often have to be energy efficient, since external power supplies will often not be available and since it is neither practically nor economically feasible to frequently replace or recharge their batteries. In some scenarios, the MTC devices may not even be battery powered, but may instead rely on energy harvesting, e.g. gathering energy from the environment, that is, utilizing (the often limited) energy that may be tapped from sun light, temperature gradients, vibrations, etc. For such energy deprived devices, whose traffic is characterized by relatively small and more or less infrequent transactions (often delay tolerant), it may be important to minimize their energy consumption, e.g. between and in conjunction with the communication events. These MTC devices generally consume energy between the various communication events, e.g. by keeping the radio receiver active to monitor transmissions from the cellular network. Since the periods between the communication events are generally much longer than the actual communication events, this energy consumption may represent a significant part of the overall energy consumption and may even dominate the energy consumption in scenarios where the communication events are infrequent or very infrequent.

Furthermore, MTC may become an important revenue stream for operators and may have a huge potential from the operator perspective. It may be beneficial for operators to be able to serve MTC devices using already deployed radio access technology. Therefore, 3GPP LTE has been investigated as a competitive radio access technology for efficient support of MTC. Lowering the cost of MTC devices may become an important enabler for implementation of the concept of "Internet of things". Moreover, MTC devices used for many applications may require low operational power consumption and are therefore, as explained earlier, expected to communicate with infrequent small burst transmissions. In addition, there is a substantial market for the M2M use cases of devices deployed inside buildings which would require coverage enhancement in comparison to the defined LTE cell coverage footprint.

For instance, 3GPP LTE Rel-12 has defined a UE power saving mode allowing long battery lifetime and a new UE category allowing reduced modem complexity. In Rel-13, further MTC work is expected to further reduce MTC cost and provide coverage enhancement. A key element to enable cost reduction is to introduce reduced radio frequency (RF) bandwidth of 1.4 MHz in downlink and uplink within any system bandwidth.

EPDCCH (Enhanced Physical Downlink Control Channel)

For regular UEs, the UE may be configured to monitor EPDCCH in addition to PDCCH, see e.g. the Technical Specifications 3GPP TS 36.211 (e.g. Section 6.8A) and 3GPP TS 36.213 (e.g. Section 9.1.4). For each serving cell, higher layer signaling may configure a UE with one or two EPDCCH-PRB-sets (where PRB stands for Physical Resource Block) for EPDCCH monitoring. Each EPDCCH-PRB-set comprises a set of ECCEs (i.e., Enhanced Control Channel Elements) numbered from 0 to $N_{ECCE,p,k}-1$ where $N_{ECCE,p,k}$ is the number of ECCEs in EPDCCH-PRB-set p of subframe k. Each EPDCCH-PRB-set may be configured for either localized EPDCCH transmission or distributed EPDCCH transmission.

The UE shall generally monitor a set of EPDCCH candidates on one or more activated serving cells as configured by higher layer signaling for control information, where monitoring implies attempting to decode each of the EPDCCHs in the set according to the monitored DCI (i.e., Downlink Control Information) formats. The set of EPDCCH candidates that should be monitored are defined in terms of EPDCCH UE-specific search spaces. For each serving cell, the subframes in which the UE monitors EPDCCH UE-specific search spaces are configured by higher layers, see e.g. Technical Specification 3GPP TS 36.331.

SUMMARY

The present disclosure recognizes the fact that for a normal, or regular, UE monitoring EPDCCH, the UE is typically also able to receive PDCCH. PDCCH may provide information for reception of Radio Resource Control (RRC) signaling, and the RRC signaling typically carries the configuration information of EPDCCH. However, UEs with a limited bandwidth (e.g., Rel-13 low-complexity MTC devices (or Rel-13 low complexity UEs)), are generally not capable of receiving PDCCH due to the limited bandwidth. For instance, a Rel-13 low-complexity MTC device may be able to receive an EPDCCH since an EPDCCH may be received within the 1.4 MHz reception window of a Rel-13 low-complexity MTC device and so it makes sense to use EPDCCH. However, this would assume that the EPDCCH configuration information may be conveyed in some way to the Rel-13 low-complexity MTC device. However, if EPDCCH is utilized in a straight-forward manner, the initialization of the physical downlink control channel for MTC operation may be inadequate. For example, it is foreseeable that the initialization of the PDCCH for MTC operation cannot be fulfilled with the existing procedure, since the existing procedure is typically based on PDCCH.

It is in view of the above considerations and others that the various embodiments disclosed herein have been made.

In a first of its aspects, the present disclosure presents a method performed by a User Equipment (UE) having a limited (e.g., reduced) UE bandwidth as compared with regular UEs. The method comprises receiving, from a network node, a system information block which is configured for UEs having said limited UE bandwidth, the system information block comprising information related to a configuration of a common search space of a physical control channel for UEs having said limited UE bandwidth.

The UE having the limited UE bandwidth may be a Rel-13 low-complexity UE and the regular UEs may be UEs of earlier releases. The UE having the limited UE bandwidth may for example be a MTC device.

The system information block may include information related to frequency-domain configuration of a physical downlink control channel. The frequency-domain configuration may include a resource block assignment of the physical downlink control channel.

Additionally, or alternatively, the system information block may comprise information related to a time-domain configuration of the physical downlink control channel. The time-domain configuration may include a starting subframe of the physical downlink control channel. Additionally, or alternatively, the time-domain configuration may include a number of repetitions of the physical downlink control channel.

The system information block may be a low-complexity system information block (LC-SIB) and the physical control channel may be a low-complexity physical downlink control channel (LC-PDCCH).

The method may additionally comprise obtaining a unicast LC-PDCCH within said common search space.

For example, the LC-PDCCH may be associated with a unicast physical downlink shared channel (PDSCH) carrying a dedicated Radio Resource Control (RRC) message. The RRC message may include information related to the LC-PDCCH configuration. The information related to the LC-PDCCH configuration may comprise a UE-specific LC-PDCCH region.

The present disclosure also presents UE having a limited (e.g., reduced) UE bandwidth as compared with regular UEs. The UE comprises means adapted to receive, from a network node, a system information block which is configured for UEs having said limited UE bandwidth, the system information block comprising information related to a configuration of a common search space of a physical control channel for UEs having said limited UE bandwidth.

The UE having the limited UE bandwidth may be a Rel-13 low-complexity UE and regular UEs may be UEs of earlier releases. The UE having the limited UE bandwidth may for example be a MTC device.

The system information block may include information related to frequency-domain configuration of a physical downlink control channel. The frequency-domain configuration may include a resource block assignment of the physical downlink control channel.

Additionally, or alternatively, the system information block may comprise information related to a time-domain configuration of the physical downlink control channel. The time-domain configuration may include a starting subframe of the physical downlink control channel. Additionally, or alternatively, the time-domain configuration may include a number of repetitions of the physical downlink control channel.

The system information block may be a LC-SIB and the physical control channel is a LC-PDCCH.

The UE may further comprise means adapted to obtain a unicast LC-PDCCH within said common search space. The LC-PDCCH may be associated with a unicast PDSCH carrying a dedicated RRC message. The RRC message may include information related to the LC-PDCCH configuration. The information related to the LC-PDCCH configuration may comprise a UE-specific LC-PDCCH region.

Furthermore, the present disclosure presents a method performed by a network node, such as an evolved NodeB (eNB). The method comprises transmitting, to one or several UEs, a system information block which is configured for UEs having a limited (e.g., reduced) UE bandwidth as compared with regular UEs, the system information block comprising information related to a configuration of a common search space of a physical control channel for UEs having said limited UE bandwidth.

Again, the UE having the limited UE bandwidth may be a Rel-13 low-complexity UE and regular UEs may be UEs of earlier releases.

The system information block may information related to frequency-domain configuration of a physical downlink control channel. The frequency-domain configuration may include a resource block assignment of the physical downlink control channel.

Additionally, or alternatively, the system information block may comprise information related to a time-domain configuration of the physical downlink control channel. The time-domain configuration may include a starting subframe of the physical downlink control channel. Additionally, or alternatively, the time-domain configuration may include a number of repetitions of the physical downlink control channel.

The system information block may be a LC-SIB and the physical control channel may be a LC-PDCCH.

Also, the present disclosure presents a network node such as an evolved NodeB. The network node comprises means adapted to transmit, to one or several UEs, a system information block which is configured for UEs having a limited (e.g., reduced) UE bandwidth as compared with regular UEs, the system information block comprising information related to a configuration of a common search space of a physical control channel for UEs having said limited UE bandwidth.

The system information block may information related to frequency-domain configuration of a physical downlink control channel. The frequency-domain configuration may include a resource block assignment of the physical downlink control channel.

Additionally, or alternatively, the system information block may comprise information related to a time-domain configuration of the physical downlink control channel. The time-domain configuration may include a starting subframe of the physical downlink control channel. Additionally, or alternatively, the time-domain configuration may include a number of repetitions of the physical downlink control channel.

The system information block may be a LC-SIB and the physical control channel may be a LC-PDCCH.

In a second of its aspects, the present disclosure presents a random access (RA) procedure based method performed by a UE having a limited (e.g., reduced) UE bandwidth as compared with regular UEs. The UE having the limited UE bandwidth may be a MTC device. The method comprises receiving, from a network node, a random access response (RAR) which is configured for UEs having said limited UE bandwidth, the random access response comprising Downlink Control Information (DCI) for the UE having said limited UE bandwidth.

The UE having the limited UE bandwidth may be a Rel-13 low-complexity UE and regular UEs may be UEs of earlier releases.

The random access response may be a low-complexity random access response (LC-RAR).

The DCI may comprise, or otherwise indicate, information related to an initial LC-PDCCH configuration for the UE.

The method may further comprise, prior to receiving the RAR, transmitting a Physical Random Access Channel (PRACH) to the network node.

The method may comprise utilizing the received DCI to receive one or more initial low-complexity physical downlink control channels (LC-PDCCHs).

The one or more initial LC-PDCCHs may comprise or otherwise indicate information related to the reception of a physical downlink shared channel (PDSCH) carrying a dedicated RRC message. The dedicated RRC may provide the full LC-PDCCH configuration.

In some embodiments, the RAR may include frequency-domain resource allocation information of a physical downlink control channel. Additionally, or alternatively, the RAR may include uplink resource allocation for an uplink physical channel. Additionally, or alternatively, the RAR may includes 3-bit MCS information for an uplink physical channel.

Furthermore, the present disclosure presents a UE having a limited (e.g., reduced) UE bandwidth as compared with regular UEs. The UE having the limited UE bandwidth may be a MTC device. The UE comprises means adapted to receive, from a network node, a RAR which is configured for UEs having said limited UE bandwidth, the RAR comprising DCI for the UE having said limited UE bandwidth.

The UE having the limited UE bandwidth may be a Rel-13 low-complexity UE and regular UEs may be UEs of earlier releases.

The RAR may be a LC-RAR.

The DCI may comprise, or otherwise indicate, information related to an initial LC-PDCCH configuration for the UE.

The UE may further comprise means adapted to transmit a Physical Random Access Channel, PRACH, to the network node prior to receiving the RAR:

The UE may also comprise means adapted to utilize the received DCI to receive one or more initial LC-PDCCHs. The one or more initial LC-PDCCHs may comprise or otherwise indicate information related to the reception of a PDSCH carrying a dedicated RRC message. The dedicated RRC may provide the full LC-PDCCH configuration.

In some embodiments, the RAR may include frequency-domain resource allocation information of a physical downlink control channel. Additionally, or alternatively, the RAR may include uplink resource allocation for an uplink physical channel. Additionally, or alternatively, the RAR may includes 3-bit MCS information for an uplink physical channel.

The present disclosure also presents a RA procedure based method performed by a network node, such as an evolved NodeB (eNB). The method comprises transmitting, to a UE having a limited (e.g., reduced) UE bandwidth as compared with regular UEs, a RAR which is configured for UEs having said limited UE bandwidth, the RAR comprising DCI for the UE having said limited UE bandwidth.

The UE having the limited UE bandwidth may be a Rel-13 low-complexity UE and regular UEs may be UEs of earlier releases.

The DCI may comprise, or otherwise indicate, information related to an initial LC-PDCCH configuration for the UE.

In some embodiments, the RAR may include frequency-domain resource allocation information of a physical downlink control channel. Additionally, or alternatively, the RAR may include uplink resource allocation for an uplink physical channel. Additionally, or alternatively, the RAR may includes 3-bit MCS information for an uplink physical channel.

Moreover, the present disclosure presents a network node comprising means adapted to transmit, to a UE having a limited (e.g., reduced) UE bandwidth as compared with regular UEs, a RAR which is configured for UEs having said limited UE bandwidth, the RAR comprising DCI for the UE having said limited UE bandwidth.

The DCI may comprise, or otherwise indicate, information related to an initial LC-PDCCH configuration for the UE.

In some embodiments, the RAR may include frequency-domain resource allocation information of a physical downlink control channel. Additionally, or alternatively, the RAR may include uplink resource allocation for an uplink physical channel. Additionally, or alternatively, the RAR may includes 3-bit MCS information for an uplink physical channel.

As will be appreciated, this disclosure thus presents various embodiments that allow UEs having a limited (e.g., reduced) bandwidth, such as low-complexity UEs (e.g. Rel-13 MTC devices), to operate in a legacy LTE system with maintained, or improved, performance.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

Figure 1:
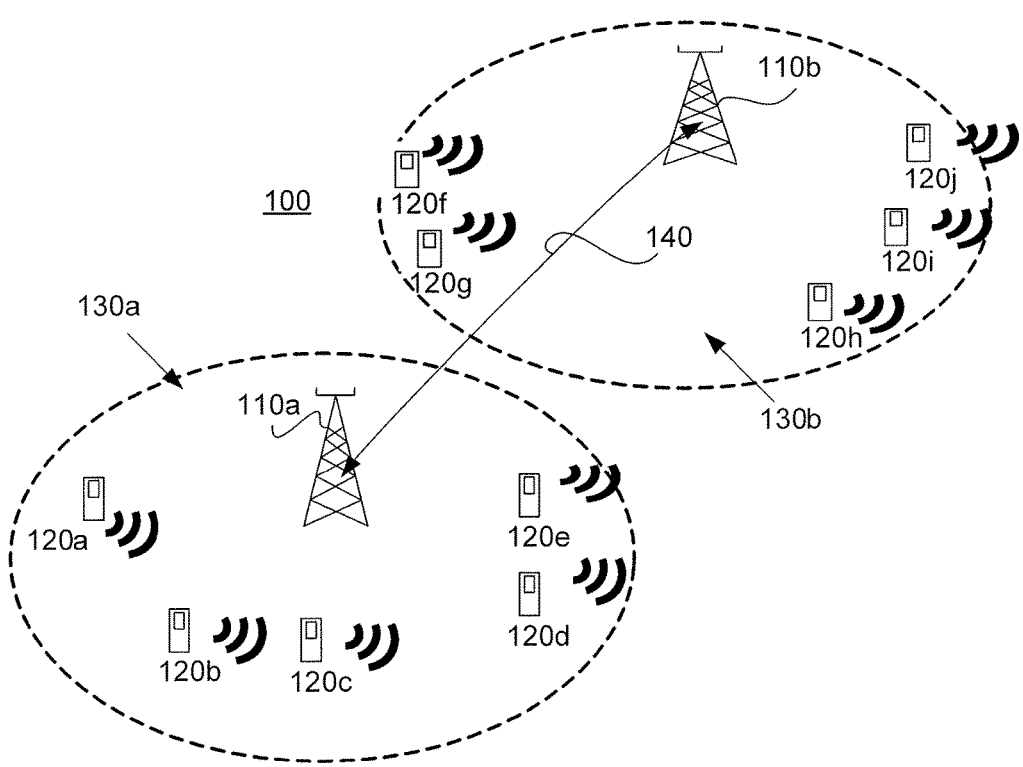
FIG. 1 illustrates an example 3GPP LTE radio communication system.
Figure 2:
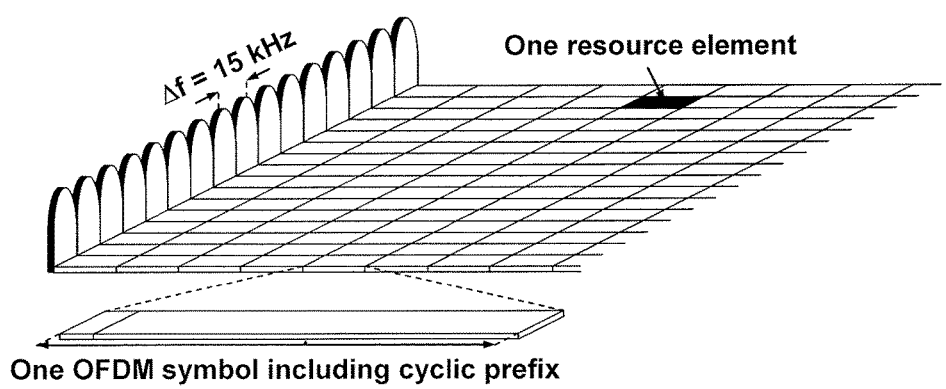
FIG. 2 illustrates an example of a LTE downlink (DL) physical resource.

The technology will now be described more fully hereinafter with reference to the accompanying drawings, in which certain embodiments are shown. The technology may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps throughout the description.

The embodiments described in the following recognize the fact that for a normal, or regular, UE monitoring EPDCCH, the UE is typically also able to receive PDCCH. PDCCH may provide information for reception of Radio Resource Control (RRC) signaling, and the RRC signaling typically carries the configuration information of EPDCCH. However, for Rel-13 low-complexity MTC devices (or Rel-13 low complexity UEs), the MTC device is generally not capable of receiving PDCCH due to the reduced bandwidth. A Rel-13 low-complexity MTC device may be able to receive an EPDCCH since an EPDCCH may be received within the 1.4 MHz reception window of a Rel-13 low-complexity MTC device and so it makes sense to use EPDCCH. However, this would assume that the EPDCCH configuration information may be conveyed in some way to the Rel-13 low-complexity MTC device. However, if EPDCCH is utilized in a straight-forward manner, the initialization of the physical downlink control channel for MTC operation may be inadequate. For example, it is foreseeable that the initialization of the PDCCH for MTC operation cannot be fulfilled with the existing procedure, since the existing procedure is typically based on PDCCH.

It is in view of the above considerations and others that the various embodiments disclosed herein have been made.

In accordance with one of its aspects, this disclosure therefore presents techniques that allow low-complexity UEs, e.g. Rel-13 MTC devices, to operate in a legacy LTE system with maintained, or improved, performance.

As will be further detailed herein, the disclosure generally presents two different aspects of the technology:

Aspect 1: Initialization of LC-PDCCH via system information block (SIB) designed for low-complexity UEs (labeled as LC-SIB). LC-SIB may comprise the configuration of common search space of LC-PDCCH, including the frequency and time domain parameters, etcetera.

Aspect 2: Initialization of LC-PDCCH via a random access response (RAR) designed for low-complexity UEs (labeled as LC-RAR). The LC-RAR, which is typically (but not necessarily) the Msg2 of the random access procedure, may carry a simplified configuration of LC-PDCCH in a UE-specific search space.

As used in the following, the term "user equipment (UE)" is used to mean any device, which can be used by a user to communicate. Also, the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC devices, which do not necessarily involve human interaction as explained hereinabove. Also, when used herein the term "radio network node" as used herein generally denotes a fixed point being capable of communicating with the UE. As such, it may be referred to as a base station, a radio base station, a NodeB or an evolved NodeB (eNB), a Radio Network Controller (RNC), access point, etcetera. Within the context of this disclosure it should be understood that the term "radio network node" may denote a node that is not necessarily part of what is typically referred to as a "radio access network", e.g. a Mobility Management Entity (MME), a Serving General Packet Radio Service Support Node (SGSN), a Home Subscriber Server (HSS) or a Home Location Register (HLR). Thus, when used herein the term "radio network node" may also include, e.g., CN nodes.

In the following, various aspect of the technology will be presented. As used herein the term "low complexity UE" is used to refer to a UE, which has a lower complexity as compared with other, normal or regular, UEs. In Rel-13, the 3GPP introduces the term "Rel-13 low complexity UE". A Rel-13 low-complexity UE is used to refer to a UE, which has a lower complexity as compared with other, normal or regular, UEs (i.e. UEs of earlier releases such as Rel-12, or Rel-11). One characteristic of a low complexity UE is that this UE has reduced UE bandwidth of 1.4 MHz in downlink and uplink. In other words, a low complexity UE is a UE having limited UE bandwidth of e.g. 1.4 MHz in DL and UL. Other characteristics of a low complexity UR may e.g. be found in section 4.1 of the 3GPP LTE Rel-13 work item description RP-141865, which has been presented at the 3GPP TSG RAN Meeting #66 in Edinburgh, Scotland, in September 2014. A low complexity UE may be embodied as a MTC device. Thus, a low complexity UE may sometimes be interchangeably referred to as a low complexity MTC device. In the following description, the term "UE" refers to low-complexity UE unless indicated otherwise. As will be appreciated by those skilled in the art, a low-complexity UE may hence operate at a narrower bandwidth as compared to regular, or normal, UEs. In other words, a UE having a limited (e.g., reduced) bandwidth may operate at a reduced bandwidth in DL and/or UL. More specifically, an UE having a limited (e.g., reduced) bandwidth may operate on reduced downlink bandwidth in the downlink system bandwidth, and/or on reduced uplink bandwidth within the uplink system bandwidth. Also, in the following LC-PDCCH refers to the physical downlink control channel (PDCCH) defined to support the low-complexity UE, i.e. the UE with limited (or, reduced) bandwidth. Is should be appreciated that while the low-complexity UE is used as an example in the following description, the design of this channel (i.e., LC-PDCCH) may be utilized by other types of UEs as well. LC-PDCCH may e.g. be introduced as a new physical downlink control channel or as a new form of EPDCCH.

Aspect 1: LC-PDCCH Initialization via SIB

Figure 3:
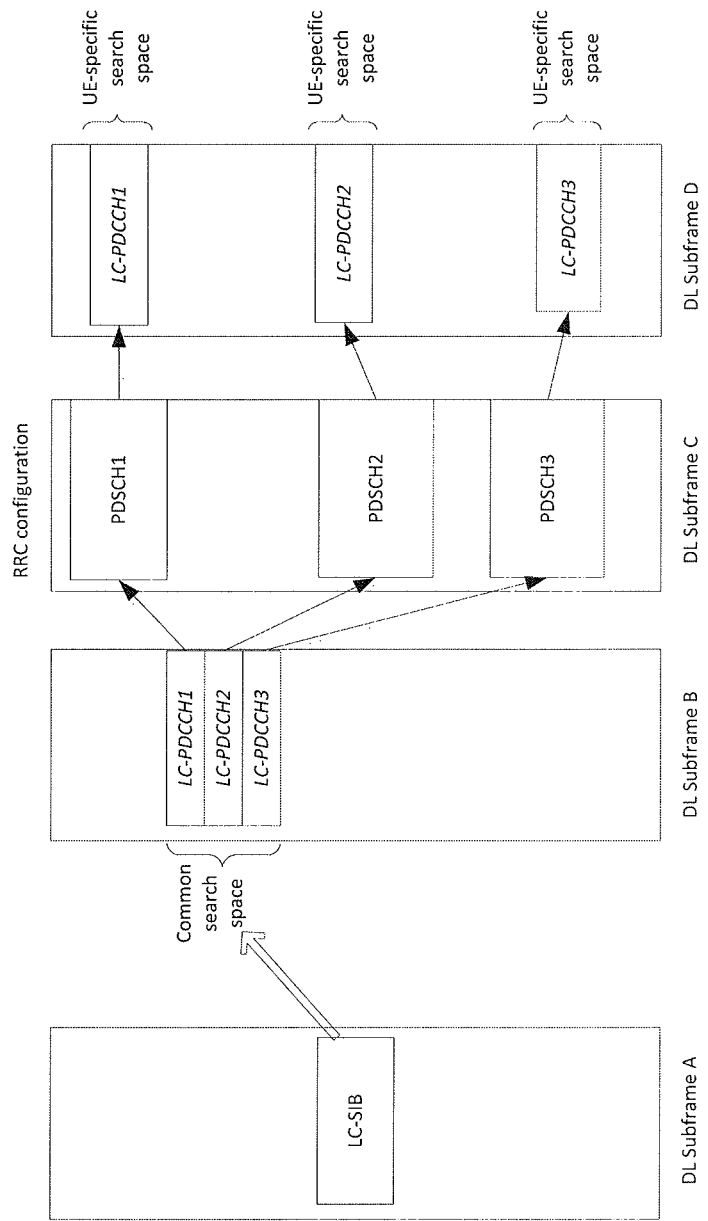
FIG. 3 illustrates a LC-SIB based procedure to initialize LC-PDCCH configuration.

LC-SIB based LC-PDCCH initialization procedure is illustrated with an example in FIG. 3 and described below:

(a) A network node (e.g., eNB) transmits a system information block (SIB) configured for low-complexity UEs. Therefore, the SIB may be referred to as LC-SIB (Low Complexity-SIB). Typically, the network node broadcasts the LC-SIB to one or several UEs. Accordingly, a low-complexity UE is configured to receive a LC-SIB transmitted, e.g. broadcasted, from the network node. The LC-SIB may be configured to provide configuration of LC-PDCCH common search space. Here it is assumed that LC-SIB can be received without PDCCH/EPDCCH/LC-PDCCH, or received with fixed-format LC-PDCCH. This is illustrated in DL subframe A of FIG. 3.

(b) A UE obtains (e.g., acquires or receives) a unicast LC-PDCCH located in the LC-PDCCH common search space. In FIG. 3, three unicast LC-PDCCHs are schematically illustrated to co-exist in the common search space in DL subframe B, where each LC-PDCCH is for a different UE (i.e., where each LC-PDCCH is targeting one specific UE among a plurality of UEs).

(c) The unicast LC-PDCCH is typically, but not necessarily, associated with a unicast PDSCH carrying dedicated RRC message, where the dedicated RRC message is configured to provide the LC-PDCCH configuration such as the UE-specific LC-PDCCH region. This is illustrated in DL subframe C of FIG. 3.

(d) Subsequent LC-PDCCHs for the UE may be transmitted, i.e. sent, using the LC-PDCCH configuration provided in the RRC message. This is illustrated in DL subframe D of FIG. 3.

In (b) above, there may be one LC-PDCCH common search space which is shared by all low-complexity UEs, e.g. if the number of UEs to be served is relatively small.

Alternatively, to provide additional space to support more UEs simultaneously, two or more common search spaces may be configured by LC-SIB, e.g. with each UE implicitly mapped to a common search space. For example, two search spaces may be configured, where UEs with even UE ID:s are mapped to one search space, and UEs with odd UE ID:s are mapped to the other search space.

The LC-SIB configuration of LC-PDCCH common search space may for instance include one or more of the following parameters:

The frequency-domain configuration of the common search space. This may include:
the resource block assignment; and/or
the number of PRB pairs allocated to the common search space. In Rel.11, an EPDCCH set consists of N=2, 4 or 8 PRB pairs. In Rel-13, a new format may be defined to support EPDCCH sets of N=6.

The time-domain configuration of the common search space. This may include:
  the starting time (e.g., radio frame number, subframe number) of a potential LC-PDCCH transmission;
  the number of repetitions across the subframes to transmit the LC-PDCCH; and/or
  the subframe pattern where the UE should monitor common search space of LC-PDCCH.
The start OFDM symbol of LC-PDCCH;
Transmission type, such as "localized" and "distributed";
The DMRS scrambling sequence initialization parameter $n_{ID,i}^{EPDCCH}$ defined in TS 36.211;
Certain PUCCH resource indicator (analogous to pucch-ResourceStartOffset);

Various features of this aspect are novel over the existing art, some of which are listed in this non-exhaustive list of example features:
  LC-SIB is typically dedicated to low-complexity UEs and, accordingly, not all UEs in a cell;
  LC-SIB is limited to a 6-PRB group located at the center of system bandwidth;
  The common search space is not the fall-back of UE-specific search space; rather they occupy different 6-PRB groups, and the UE may not be capable of simultaneously monitor both. (In existing art, common search space is like fall-back of UE-specific search space, and the UE monitors both simultaneously in a subframe).
  The LC-PDCCH configuration parameters are different from existing art. For example, this includes both frequency & time domain parameters.

Aspect 2: LC-PDCCH Initialization via Random Access Response (RAR)

The LC-PDCCH initialization procedure may give low-complexity UEs such as Rel-13 MTC devices the initial configuration of UE-specific EPDCCH in the very beginning, e.g. before the UE is generally capable of receiving any unicast PDSCH (e.g., before the UE is able to receive PDSCH carrying RRC). The assumption is that the RAR may be sent without EPDCCH and/or LC-PDCCH, or sent with fixed-format LC-PDCCH. A benefit is to avoid defining EPDCCH common search space. It may be beneficial to construct, or define, a new type of RAR message for low-complexity UEs. Also, the RAR of this new type would not be intended to be read by normal, or regular, UEs.

Figure 4:
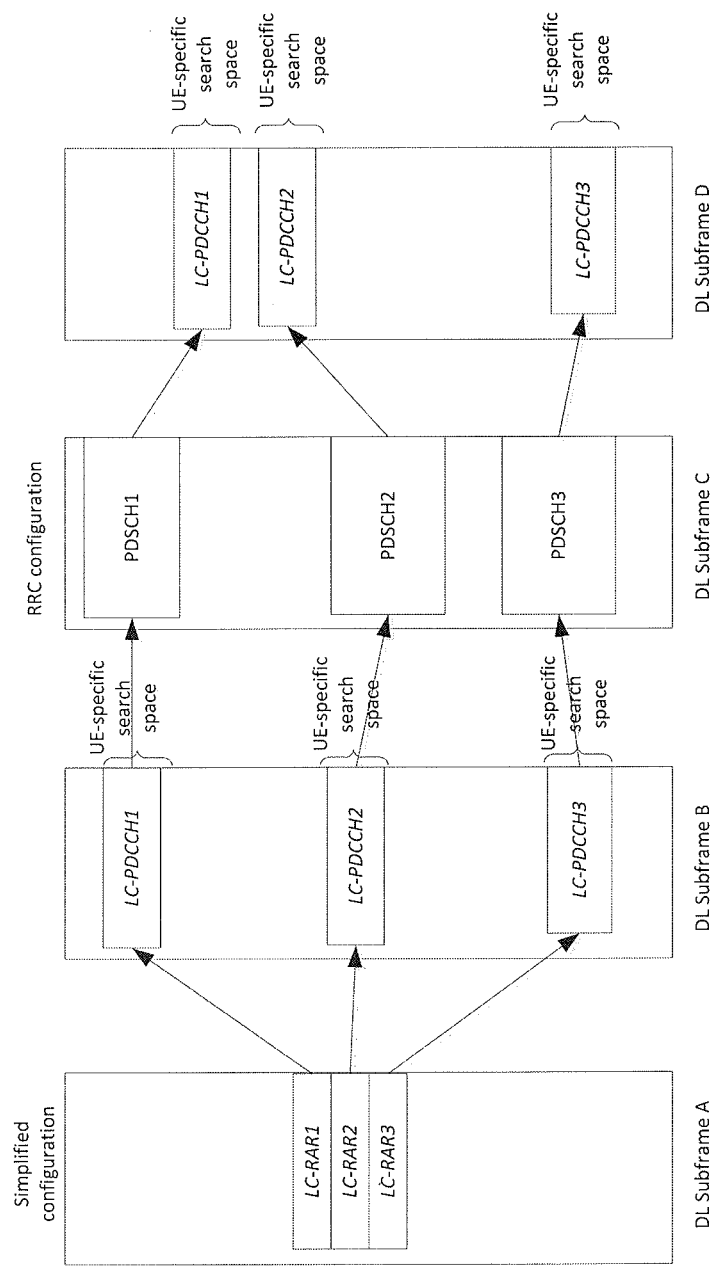
FIG. 4 illustrates a LC-RAR based procedure to initialize LC-PDCCH configuration.

An example of a RAR-based LC-PDCCH initialization procedure is schematically illustrated in FIG. 4 and described below:

(e) The UE performs a random access procedures by sending PRACH to the network node (e.g. eNB);
(f) The network node (e.g., the eNB) responds to the UE with an LC-RAR. The LC-RAR contains a downlink control information (DCI) for the UE. The DCI provides the initial LC-PDCCH configuration for the UE. Three LC-RARs are illustrated in DL subframe A in FIG. 4, each LC-RAR for a different UE;
(g) The UE uses or otherwise utlizes the DCI in LC-RAR to receive the initial LC-PDCCH(s). Three unicast LC-PDCCHs are illustrated in DL subframe B in FIG. 4, where each LC-PDCCH is for a different UE;
(h) The initial LC-PDCCH(s) may provide information for receiving PDSCH carrying the dedicated RRC message. The dedicated RRC message may provide the full LC-PDCCH configuration; Three PDSCHs carrying RRC message are illustrated in DL subframe C in FIG. 3, each PDSCH for a different UE;

It should be appreciated that all LC-PDCCH transmissions sent before the dedicated RRC message may use the initial LC-PDCCH configuration. For example Message 3 (i.e., Msg 3) of the random access procedure may use the initial LC-PDCCH configuration.
(i) Subsequent LC-PDCCHs may use the full LC-PDCCH configuration; three unicast LC-PDCCH transmissions are illustrated in DL subframe D of FIG. 4, as an example.

Furthermore, it should be appreciated that that variations of the procedure above are possible or otherwise conceivable. In one example, the simplified configuration may used as a default configuration of LC-PDCCH. In this case, the simplified LC-PDCCH configuration can be used throughout a session of data transmission, without the need of receiving the full LC-PDCCH configuration in a RRC message.

The minimum information of LC-PDCCH that needs to be carried by the new RAR would typically be the DL resource block assignment for unicast LC-PDCCH (e.g., start PRB index of the 6-PRB group for MTC UE).

Other LC-PDCCH configuration info that may or may not be necessary to include are:
  DMRS (i.e., demodulation reference signal) scrambling sequence initialization parameter $n_{ID,i}^{EPDCCH}$; and/or
  Certain PUCCH resource indicator (analogous to pucch-ResourceStartOffset);

The LC-PDCCH configuration parameters that may be predefined (thus no need to signal) may include:
  N, the number of PRB pairs allocated to the common search space. One example is fix, e.g. N=6 in a specification;
  the starting time (e.g., radio frame number, subframe number) of a potential LC-PDCCH transmission. One example is that the LC-PDCCH may be predefined to start at subframe #0 of each radio frame;
  the number of repetitions across the subframes to transmit the LC-PDCCH can be predefined to be same number of repetitions for RAR reception; and/or
  the subframe pattern where the UE should monitor the UE-specific search space of LC-PDCCH is predefined to be consecutive subframes.

The existing RAR typically contains a 20-bit "UL Grant" field. For the LC-RAR, one possible method is to divide the 20 bits currently used for UL Grant into two fields (10-bit each, for example):
  LC-PDCCH configuration
    Frequency-domain resource allocation in terms of PRB pair location and number of PRBs. For example, non-overlapping 6-PRB group would only need 4 bits; and/or
    Time-domain configuration such as the subframe pattern and number of repetitions.
  UL Grant (new format with reduced size). The reduced size may be achievable considering:
    (1 bit saving) No PUSCH frequency hopping;
    Much limited freedom for UL resource allocation. For example, non-overlapping 6-PRB group only need 4 bits; and/or
    (1 bit saving) 8 MCS choices (all QPSK (i.e., Quadrature Phase Shift Keying)) rather than 16 MCS choices.

Figure 5:
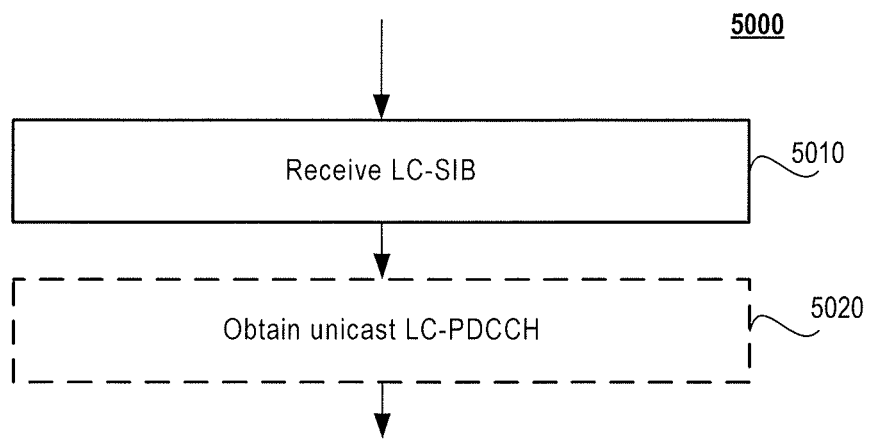
FIG. 5 is a flowchart of a method according to one example embodiment.

In view of the detailed description outlined hereinabove, the technology disclosed herein thus encompasses without limitation the following example embodiments:

Aspect 1:

Reference is now made to FIG. 5, which illustrates a method 5000 performed by a UE having a limited, e.g. reduced, UE bandwidth (e.g. a Rel-13 low-complexity UE) as compared with regular UEs (e.g., UEs of earlier releases). The method comprises: receiving 5010, from a network node, a system information block (e.g., LC-SIB) which is configured for UEs having said limited UE bandwidth, the system information block comprising information related to a configuration of a common search space of a physical control channel for UEs having said limited UE bandwidth (i.e., LC-PDCCH).

The method may additionally comprise obtaining 5020, or otherwise acquiring, a unicast LC-PDCCH within said common search space.

In one embodiment, the LC-PDCCH is associated with a unicast physical downlink shared channel (PDSCH) carrying a dedicated RRC message. The RRC message may include information related to the LC-PDCCH configuration, e.g. the UE-specific LC-PDCCH region.

In one embodiment, a method may additionally comprise subsequently transmitting LC-PDCCHs for the UE(s) using, or otherwise utilizing, the LC-PDCCH configuration provided in the RRC message.

Figure 6:
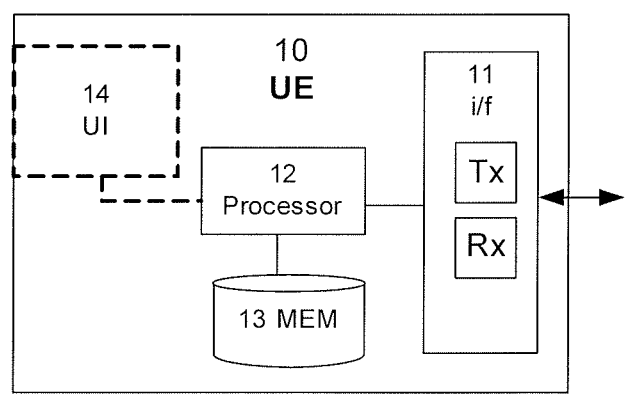
FIG. 6 schematically illustrates an example implementation of a low-complexity UE.

FIG. 6 schematically illustrates an example embodiment of a UE 10. The UE 10 is a UE 10 having a limited UE bandwidth (e.g. a Rel-13 low-complexity UE) as compared with regular UEs (e.g., UEs of earlier releases). The UE 10 comprises means 11 adapted to receive, from a network node (e.g., eNB), a system information block (i.e., LC-SIB) which is configured for UEs having said limited UE bandwidth, the system information block comprising information related to a configuration of a common search space of a physical control channel for UEs having said limited UE bandwidth (i.e., LC-PDCCH). The UE 10 may additionally comprise means 11, 12, 13 adapted to obtain, or otherwise acquire (e.g. receive), a unicast LC-PDCCH within said common search space. In one embodiment, the LC-PDCCH is associated with a unicast physical downlink shared channel (PDSCH) carrying a dedicated RRC message. The RRC message may include information related to the LC-PDCCH configuration, e.g. the UE-specific LC-PDCCH region. In one embodiment, the UE 10 may additionally comprise means 11 adapted to transmit LC-PDCCHs for the UE using, or otherwise utilizing, the LC-PDCCH configuration provided in the RRC message.

In one example implementation, the UE 10 comprises a processor 12 and a memory 13. Also, a communications interface 11 may be provided in order to allow the UE 10 to communicate with other apparatuses (e.g., other UEs and/or network nodes), etc. To this end, the communications interface 11 may comprise a transmitter (Tx) and a receiver (Rx). Alternatively, the communications interface 11 may comprise a transceiver (Tx/Rx) combining both transmission and reception capabilities. The communications interface 11 may include a RF interface allowing the UE 10 to communicate with apparatuses etc through a radio frequency band through the use of different radio frequency technologies such as LTE, WCDMA, any other cellular network standardized by the 3rd Generation Partnership Project (3GPP), or any other wireless technology such as Wi-Fi, Bluetooth®, etcetera. The UE may optionally include a user interface UI 14. However, the UI 14 is not necessary. For example, MTC UEs (a.k.a MTC devices) are typically provided without the UI 14.

The memory 13 may comprise instructions executable by the processor 12 whereby the UE 10 is operative to receive (e.g. via the Rx of i/f 11), from a network node (e.g., eNB), a system information block (i.e., LC-SIB) which is configured for UEs having said limited UE bandwidth, the system information block comprising information related to a configuration of a common search space of a physical control channel for UEs having said limited UE bandwidth (i.e., LC-PDCCH). The memory 13 may additionally comprise instructions executable by the processor 12 whereby the UE 10 is operative to obtain, or otherwise acquire (e.g. receive via the Rx of the i/f 11), a unicast LC-PDCCH within said common search space. In one embodiment, the LC-PDCCH is associated with a unicast physical downlink shared channel (PDSCH) carrying a dedicated RRC message. The RRC message may include information related to the LC-PDCCH configuration, e.g. the UE-specific LC-PDCCH region. In one embodiment, the memory 13 may additionally comprise instructions executable by the processor 12 whereby the UE 10 is operative to transmit (e.g. via the Tx of i/f 11) LC-PDCCHs for the UE using, or otherwise utilizing, the LC-PDCCH configuration provided in the RRC message.

Figure 7:
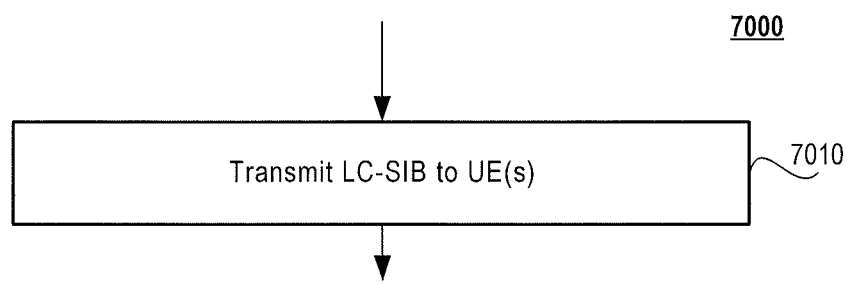
FIG. 7 is a flowchart of a method according to one example embodiment.

As is illustrated in FIG. 7. a corresponding method 7000 performed by a network node, such as an eNB is also provided. The method 7000 may comprise transmitting 7010, to one or several UEs, a system information block (i.e., LC-SIB) which is configured for UEs having a limited UE bandwidth (e.g. a Rel-13 low-complexity UE) as compared with regular UEs (e.g., UEs of earlier releases), the system information block comprising information related to a configuration of a common search space of a physical control channel for UEs having said limited UE bandwidth (i.e., LC-PDCCH).

Figure 8:
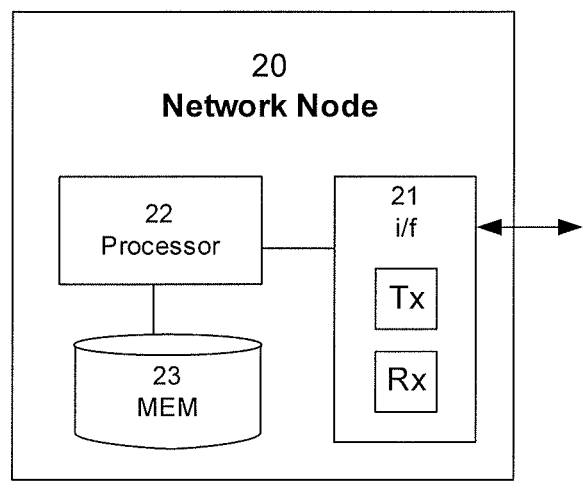
FIG. 8 schematically illustrates an example implementation of network node, such as eNB, for broadcasting LC-SIBs to UEs.

This disclosure also presents a network node 20, such as an eNB. As can be seen in FIG. 8, the network node 20 may comprise means 21 adapted to transmit, to one or several UEs, a system information block (i.e., LC-SIB) which is configured for UEs having a limited UE bandwidth (e.g. a Rel-13 low-complexity UE) as compared with regular UEs (e.g., UEs of earlier releases), the system information block comprising information related to a configuration of a common search space of a physical control channel for UEs having said limited UE bandwidth (i.e., LC-PDCCH).

In one example implementation as illustrated in FIG. 8, the network node 20 comprises a processor 22 and a memory 23. Also, a communications interface 21 may be provided in order to allow the network node 20 to communicate with other apparatuses (e.g., other UEs and/or network nodes), etc. To this end, the communications interface 21 may comprise a transmitter (Tx) and a receiver (Rx). Alternatively, the communications interface 21 may comprise a transceiver (Tx/Rx) combining both transmission and reception capabilities. The communications interface 21 may include a RF interface allowing the network node 20 to communicate with apparatuses etc through a radio frequency band through the use of different radio frequency technologies such as LTE, WCDMA, any other cellular network standardized by the 3rd Generation Partnership Project (3GPP), or any other wireless technology such as Wi-Fi, Bluetooth®, etcetera.

The memory 23 may comprise instructions executable by the processor 22 whereby the network node 20 is operative to transmit (e.g. via the Tx of i/f 21), to one or several UEs, a system information block (i.e., LC-SIB) which is configured for UEs having a limited UE bandwidth (e.g. a Rel-13 low-complexity UE) as compared with regular UEs (e.g., UEs of earlier releases), the system information block comprising information related to a configuration of a common search space of a physical control channel for UEs having said limited UE bandwidth (i.e., LC-PDCCH).

Figure 9:
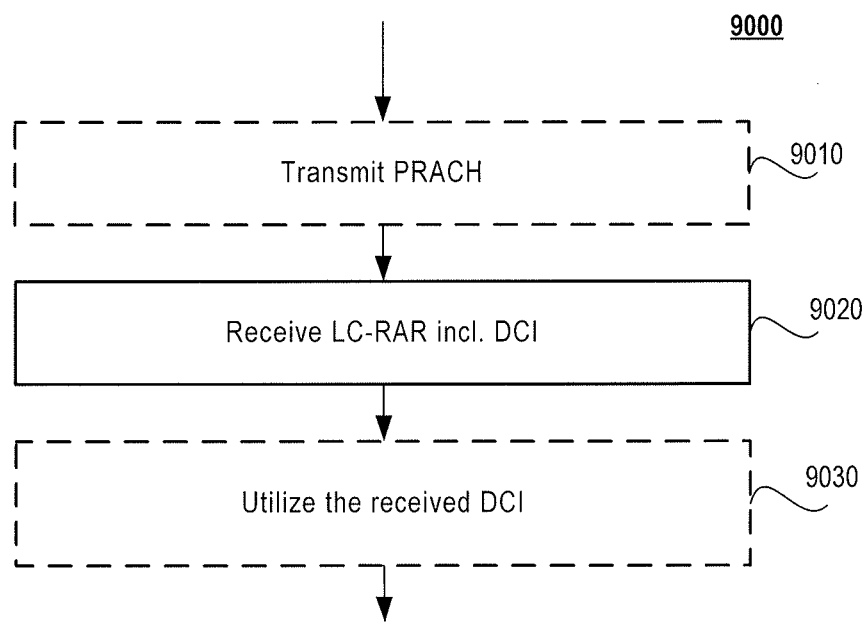
FIG. 9 is a flowchart of a method according to one example embodiment.

Aspect 2:

FIG. 9 schematically illustrates a random access (RA) procedure based method being performed by a UE having a limited, e.g. reduced, UE bandwidth (e.g. a Rel-13 low-complexity UE) as compared with regular UEs (e.g., UEs of earlier releases), the method comprising: receiving 9020, from a network node (e.g., eNB), a random access response (i.e., LC-RAR) which is configured for UEs having said limited UE bandwidth, the random access response comprising Downlink Control Information (DCI) for the UE having said limited UE bandwidth.

The DCI may comprise or otherwise indicate information related to an initial LC-PDCCH configuration for the UE.

The method may also comprise, prior to receiving 9020 the RAR, transmitting 9010 (i.e., sending) a Physical Random Access Channel (PRACH) to the network node.

Furthermore, the method may comprise using 9030, or otherwise utilizing, the received DCI to receive the initial LC-PDCCH(s). The initial LC-PDCCH(s) may comprise or otherwise indicate information related to the reception of PDSCH carrying a dedicated RRC message. In turn, the dedicated RRC message may provide the full LC-PDCCH configuration.

Figure 10:
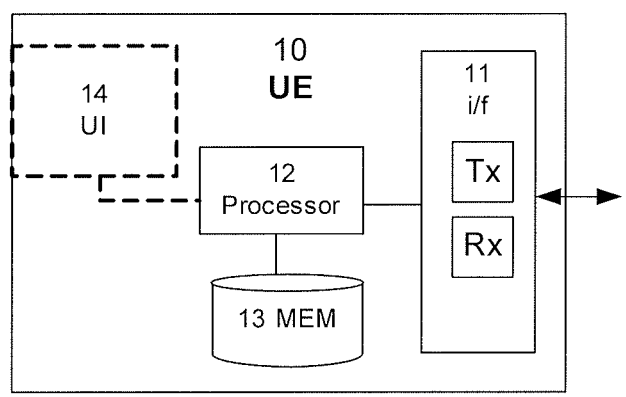
FIG. 10 schematically illustrates an example implementation of a low-complexity UE.

FIG. 10 schematically illustrates an example embodiment of a UE 10. The UE 10 has a limited UE bandwidth (e.g. a Rel-13 low-complexity UE) as compared with regular UEs (e.g., UEs of earlier releases). The UE 10 comprises means 11 adapted to receive, from a network node (e.g., eNB), a random access response (i.e., LC-RAR) which is configured for UEs having said limited UE bandwidth, the random access response comprising Downlink Control Information (DCI) for the UE having said limited UE bandwidth.

The DCI may comprise or otherwise indicate information related to an initial LC-PDCCH configuration for the UE.

The UE 10 may also comprise means 11 adapted to, prior to receiving the RAR, transmit (i.e., send) a Physical Random Access Channel (PRACH) to the network node.

Furthermore, the UE 10 may comprise means 12, 13 adapted to use, or otherwise utilize, the received DCI to receive the initial LC-PDCCH(s). The initial LC-PDCCH(s) may comprise or otherwise indicate information related to the reception of PDSCH carrying a dedicated RRC message. In turn, the dedicated RRC message may provide the full LC-PDCCH configuration.

In one example implementation, the UE 10 comprises a processor 12 and a memory 13. Also, a communications interface 11 may be provided in order to allow the UE 10 to communicate with other apparatuses (e.g., other UEs and/or network nodes), etc. To this end, the communications interface 11 may comprise a transmitter (Tx) and a receiver (Rx). Alternatively, the communications interface 11 may comprise a transceiver (Tx/Rx) combining both transmission and reception capabilities. The communications interface 11 may include a RF interface allowing the UE 10 to communicate with apparatuses etc through a radio frequency band through the use of different radio frequency technologies such as LTE, WCDMA, any other cellular network standardized by the 3rd Generation Partnership Project (3GPP), or any other wireless technology such as Wi-Fi, Bluetooth®, etcetera. The UE may optionally include a user interface UI 14. However, the UI 14 is not necessary. For example, MTC UEs (a.k.a MTC devices) are typically provided without the UI 14.

The memory 13 may comprise instructions executable by the processor 12 whereby the UE 10 is operative to receive (e.g. via the Rx of i/f 11), from a network node (e.g., eNB), a random access response (i.e., LC-RAR) which is configured for UEs having said limited UE bandwidth, the random access response comprising Downlink Control Information (DCI) for the UE having said limited UE bandwidth. The DCI may comprise or otherwise indicate information related to an initial LC-PDCCH configuration for the UE.

The communications interface 11 (e.g., the Tx thereof) may further be adapted to, prior to receiving the RAR, transmit (i.e., send) a Physical Random Access Channel (PRACH) to the network node.

The memory 13 may also comprise instructions executable by the processor 12 whereby the UE 10 is operative to use, or otherwise utilize, the received DCI to subsequently receive (e.g. via the Rx of the i/f 11) the initial LC-PDCCH(s). The initial LC-PDCCH(s) may comprise or otherwise indicate information related to the reception of PDSCH carrying a dedicated RRC message. In turn, the dedicated RRC message may provide the full LC-PDCCH configuration.

Figure 11:
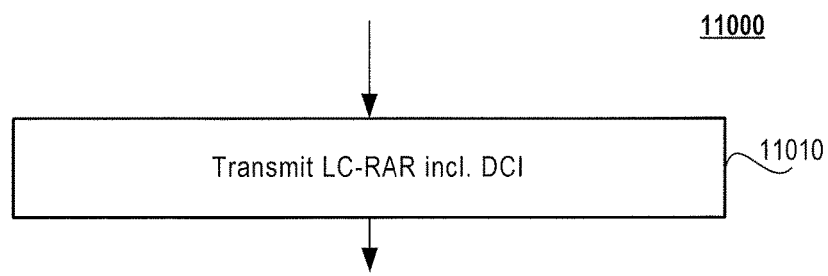
FIG. 11 is a flowchart of a method according to one example embodiment.

As is schematically illustrated in FIG. 11, a corresponding random access (RA) procedure based method 11000 performed by a network node, such as an eNB, is also provided. The method comprises transmitting 11010, to a UE having a limited UE bandwidth (e.g. a Rel-13 low-complexity UE) as compared with regular UEs (e.g., UEs of earlier releases), a random access response (i.e., LC-RAR) which is configured for UEs having said limited UE bandwidth, the random access response comprising Downlink Control Information (DCI) for the UE having said limited UE bandwidth. The DCI may comprise or otherwise indicate information related to an initial LC-PDCCH configuration for the UE.

Figure 12:
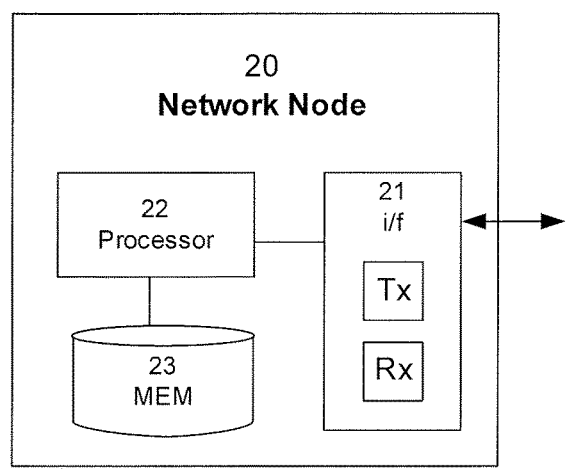
FIG. 12 schematically illustrates an example implementation of network node, such as eNB, for executing a LC-RA procedure.

FIG. 12 schematically illustrates an example embodiment of a network node 20. The network node 20 comprise means 21 adapted to transmit, to a UE having a limited UE bandwidth (e.g. a Rel-13 low-complexity UE) as compared with regular UEs (e.g., UEs of earlier releases), a random access response (i.e., LC-RAR) which is configured for UEs having said limited UE bandwidth, the random access response comprising Downlink Control Information (DCI) for the UE having said limited UE bandwidth. The DCI may comprise or otherwise indicate information related to an initial LC-PDCCH configuration for the UE.

In one example implementation as illustrated in FIG. 8, the network node 20 comprises a processor 22 and a memory 23. Also, a communications interface 21 may be provided in order to allow the network node 20 to communicate with other apparatuses (e.g., other UEs and/or network nodes), etc. To this end, the communications interface 21 may comprise a transmitter (Tx) and a receiver (Rx). Alternatively, the communications interface 21 may comprise a transceiver (Tx/Rx) combining both transmission and reception capabilities. The communications interface 21 may include a RF interface allowing the network node 20 to communicate with apparatuses etc through a radio frequency band through the use of different radio frequency technologies such as LTE, WCDMA, any other cellular network standardized by the 3rd Generation Partnership Project (3GPP), or any other wireless technology such as Wi-Fi, Bluetooth®, etcetera.

The memory 23 may comprise instructions executable by the processor 22 whereby the network node 20 is operative to transmit, to a UE having a limited UE bandwidth (e.g. a Rel-13 low-complexity UE) as compared with regular UEs (e.g., UEs of earlier releases), a random access response (i.e., LC-RAR) which is configured for UEs having said limited UE bandwidth, the random access response comprising Downlink Control Information (DCI) for the UE having said limited UE bandwidth. The DCI may comprise or otherwise indicate information related to an initial LC-PDCCH configuration for the UE.

As will be appreciated, computer program comprising instructions which when executed on at least one processor of an apparatus causes the apparatus to perform, or execute, any of the herein described methods may also be provided. A carrier comprising said computer program may also be provided. The carrier may be one of an electronic signal, an optical signal, a radio signal, or a computer readable storage medium.

Various embodiments described herein provide a technique allowing low-complexity UEs such as MTC devices to operate in e.g. a LTE system with wider system bandwidth, and be able to obtain or otherwise acquire a configuration of LC-PDCCH at the initialization stage.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. Although specific terms may be employed herein, they are used in a generic and descriptive sense only and not for purposes of limitation.

ABBREVIATIONS

3GPP 3rd Generation Partnership Project
BW Bandwidth
DL Downlink
eNB Enhanced Node-B
EPDCCH Enhance physical downlink control channel
FDD Frequency Division Duplexing
FFT Fast Fourier Transform
HARQ Hybrid ARQ
LTE Long term evolution
MCS Modulation and Coding Scheme
MME Mobile Management Entity
MTC Machine Type Communication
PDSCH Physical downlink share channel
PDCCH Physical downlink control channel
PRB Physical Resource Block
PUCCH Physical Uplink Control Channel
PUSCH Physical Uplink Shared Channel
RAR Random access response
SIB System information block
TDD Time Division Duplexing
TM Transmission mode
UE User Equipment
UL Uplink

BACKGROUND REFERENCES

The following is a list of references that provide background information to the reader and are therefore incorporated herein by reference. The references may facilitate the understanding of one or more aspects of the technology described in this disclosure:

1. 3GPP TS 36.211 V12.0.0, 3rd Generation Partnership Project; Technical Specification Group Radio Access Network; Evolved Universal Terrestrial Radio Access (E-UTRA); Physical channels and modulation (Release 12).
2. 3GPP TS 36.213 V12.0.0, 3rd Generation Partnership Project; Technical Specification Group Radio Access Network; Evolved Universal Terrestrial Radio Access (E-UTRA); Physical layer procedures (Release 12).
3. 3GPP TR 36.888 v12.0.0, Study on provision of low-cost Machine-Type Communications (MTC) User Equipments (UEs) based on LTE (Release 12)

The invention claimed is:

1. A method performed by a User Equipment, UE, having a reduced UE bandwidth as compared with regular UEs, the method comprising:
    receiving, from a network node, a system information block which is configured for UEs having said reduced UE bandwidth, the system information block comprising information related to a configuration of a low-complexity physical downlink control channel, LC-PDCCH, common search space;

receiving, within the LC-PDCCH common search space, a first unicast LC-PDCCH, the received LC-PDCCH being associated with a unicast physical downlink shared channel, PDSCH, carrying a dedicated Radio Resource Control (RRC) message;

receiving the unicast PDSCH carrying the dedicated RRC message, the dedicated RRC message comprising information related to a configuration of a LC-PDCCH UE-specific search space; and receiving, within the LC-PDCCH UE-specific search space, a second unicast LC-PDCCH.

2. The method according to claim 1, wherein the UE having the reduced UE bandwidth is a Rel-13 low-complexity UE and regular UEs are UEs of earlier releases.

3. The method according to claim 1, wherein the system information block is a low-complexity system information block, LC-SIB.

4. A User Equipment, UE, having a reduced UE bandwidth as compared with regular UEs, the UE comprising:
a processor operable to:
receive, from a network node, a system information block which is configured for UEs having said reduced UE bandwidth, the system information block comprising information related to a configuration of a low-complexity physical downlink control channel, LC-PDCCH, common search space;
receive, within the LC-PDCCH common search space, a first unicast LC-PDCCH, the received LC-PDCCH being associated with a unicast physical downlink shared channel, PDSCH, carrying a dedicated Radio Resource Control (RRC) message;
receive the unicast PDSCH carrying the dedicated RRC message, the dedicated RRC message comprising information related to a configuration of a LC-PDCCH UE-specific search space; and
receive, within the LC-PDCCH UE-specific search space, a second unicast LC-PDCCH.

5. The UE according to claim 4, wherein the UE having the reduced UE bandwidth is a Rel-13 low-complexity UE and regular UEs are UEs of earlier releases.

6. The UE according to claim 4, wherein the system information block is a low-complexity system information block, LC-SIB.

7. A method performed by a network node, the method comprising:
transmitting, to one or several UEs, a system information block which is configured for UEs having a reduced UE bandwidth as compared with regular UEs, the system information block comprising information related to a configuration of a low-complexity physical downlink control channel, LC-PDCCH, common search space;

transmitting, within the LC-PDCCH common search space, a first unicast LC-PDCCH to a UE having the reduced UE bandwidth, the transmitted LC-PDCCH being associated with a unicast physical downlink shared channel, PDSCH, carrying a dedicated Radio Resource Control (RRC) message;

transmitting, to the UE having the reduced UE bandwidth, the unicast PDSCH carrying the dedicated RRC message, the dedicated RRC message comprising information related to a configuration of a LC-PDCCH UE-specific search space; and transmitting, to the UE having the reduced UE bandwidth, within the LC-PDCCH UE-specific search space, a second unicast LC-PDCCH.

8. The method according to claim 7, wherein the UE having the reduced UE bandwidth is a Rel-13 low-complexity UE and regular UEs are UEs of earlier releases.

9. The method according to claim 7, wherein the system information block is a low-complexity system information block, LC-SIB.

10. A network node comprising:
a processor operable to:
transmit, to one or several UEs, a system information block which is configured for UEs having a reduced UE bandwidth as compared with regular UEs, the system information block comprising information related to a configuration of a low-complexity physical downlink control channel, LC-PDCCH, common search space;
transmit, within the LC-PDCCH common search space, a first unicast LC-PDCCH to a UE having the reduced UE bandwidth, the transmitted LC-PDCCH being associated with a unicast physical downlink shared channel, PDSCH, carrying a dedicated Radio Resource Control (RRC) message;
transmit, to the UE having the reduced UE bandwidth, the unicast PDSCH carrying the dedicated RRC message, the dedicated RRC message comprising information related to a configuration of a LC-PDCCH UE-specific search space; and
transmit, to the UE having the reduced UE bandwidth, within the LC-PDCCH UE-specific search space, a second unicast LC-PDCCH.

11. The network node according to claim 10, wherein the UE having the reduced UE bandwidth is a Rel-13 low-complexity UE and regular UEs are UEs of earlier releases.

12. The network node according to claim 10, wherein the system information block is a low-complexity system information block, LC-SIB.

* * * * *